United States Patent [19]
Weaver

[11] Patent Number: 5,085,414
[45] Date of Patent: Feb. 4, 1992

[54] JIG FOR FORMING TRUSSES AND THE LIKE

[76] Inventor: Austin S. Weaver, 6620 - 96th Ave., Zeeland, Mich. 49464

[21] Appl. No.: 515,603

[22] Filed: Apr. 27, 1990

[51] Int. Cl.⁵ .............................................. B30B 3/02
[52] U.S. Cl. ...................... 269/37; 269/910; 269/304; 29/281.3
[58] Field of Search ............... 269/40, 37, 43, 303, 269/304, 910; 100/913; 29/281.1, 281.3; 227/152, 154, 155

[56] References Cited
U.S. PATENT DOCUMENTS

| | | |
|---|---|---|
| 3,241,585 | 3/1966 | Jureit ................................... 269/910 |
| 4,379,426 | 3/1983 | Thompson et al. ................. 269/910 |
| 4,943,038 | 7/1990 | Harnden . | |

OTHER PUBLICATIONS

Alpine Engineered Products, Inc., New Equipment Report, Feb. 1-3, 1990, pp. 1 and 2.

*Primary Examiner*—Robert C. Watson
*Attorney, Agent, or Firm*—Varnum, Riddering, Schmidt & Howlett

[57] ABSTRACT

A jig for forming wooden trusses and like structures, including a table traversed by upwardly opening channels in which stop units are received to define the structure to formed. Each stop unit includes a stop and a clamp member which are adjustable to clamp elements of the channel between them and thereby fix the location of the stop along the length of the channel in which it is received. Each channel carries a scale at one side and the clamp member carries an index mark to be aligned with positions on the scale for accurately locating the stop.

6 Claims, 2 Drawing Sheets

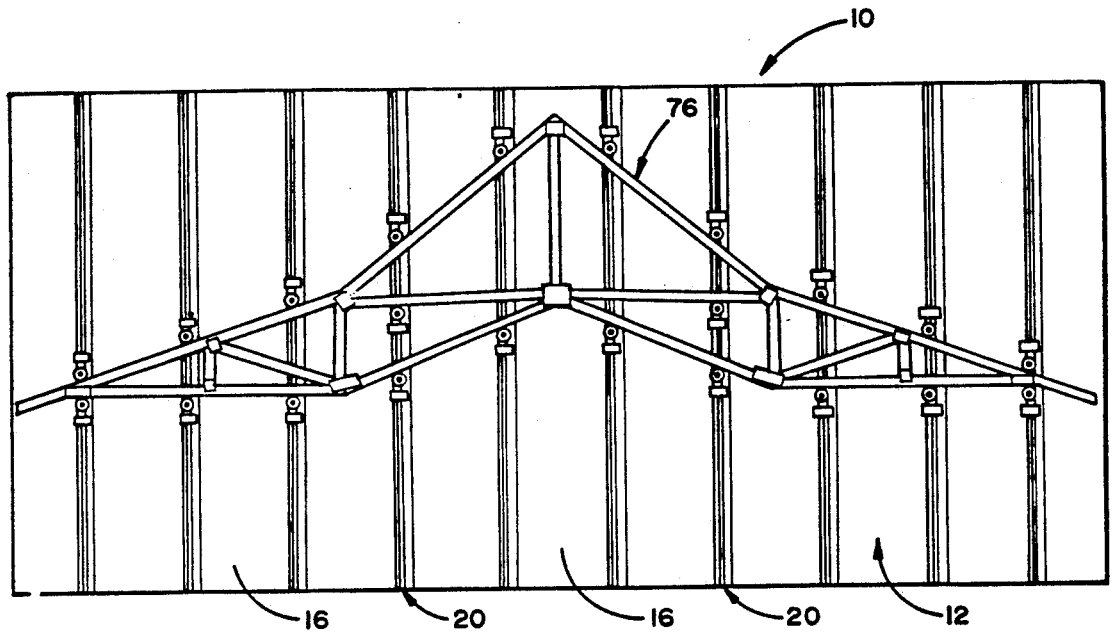
FIG. 1
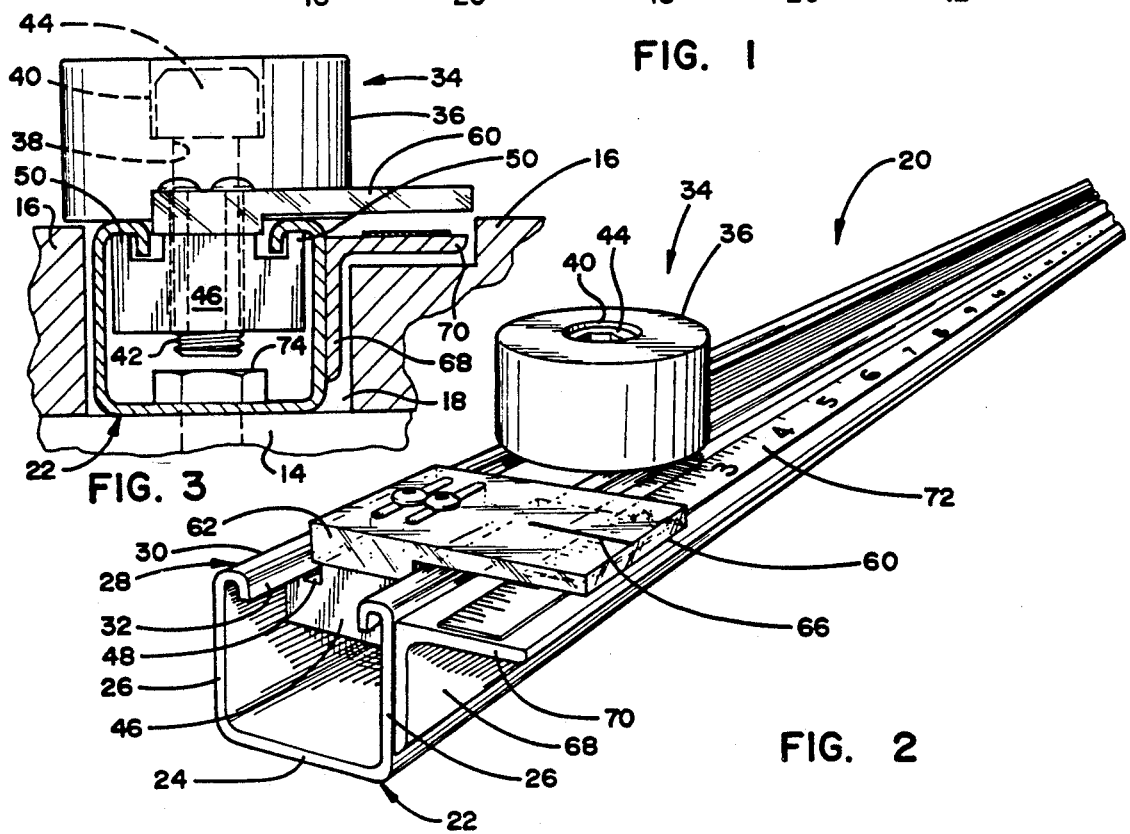
FIG. 3
FIG. 2

JIG FOR FORMING TRUSSES AND THE LIKE

BACKGROUND OF THE INVENTION

This invention relates in general to new and useful improvements in jigs, and more particularly to an improved jig for forming assemblies such as roof trusses which may vary greatly in configuration.

Wooden trusses such as roof trusses are commonly assembled on large horizontal tables supported by any suitable means at working height above a shop floor. Heretofore, stops have been laid out and affixed to the table surface using tape measures and chalk lines to provide a jig setup defining the truss to be assembled. In the case of wooden table surfaces, the stops comprise wood blocks nailed in place. The less-common steel surfaces are perforated to provide bolt holes spaced at six-inch intervals. Stop fixtures are bolted in place using these holes, the fixtures being adjustable to locate stops carried thereby more precisely.

These systems, though inefficient, have been acceptable because until recently the same jig setup was used to assemble 35 to 40 or more identical trusses in succession. Now, however, architects and builders tend to design and construct unique or "custom" residences and commercial buildings with little regard for standardized roof dimensions and configurations, and it is therefore not unusual for a truss manufacturer to receive orders for as few as four or five trusses in a given pattern. In the face of such small numbers, the foregoing conventional methods of laying out jig setups become extremely expensive procedures. Further, when a builder requires additional trusses in a given pattern after the jig setup has been removed or altered, in order to be certain that the pattern and dimensions are precisely duplicated, it has been necessary to return one of the previously made trusses to be used as a template for reproducing the jig setup.

An expedient intended to reduce the time required for setting up truss jigs has recently been developed in which recessed channels are spaced at equal intervals in parallel across the jig table surface, each channel supporting a stop at surface level, the stop being movable along the length of the channel by means of a worm drive which includes a threaded shaft extending longitudinally within the channel. Each channel originates at an edge of the table, extending inwardly therefrom to terminate short of the opposing edge. Alternate channels originate at opposite edges. The threaded shafts are rotated by means of an air wrench to position the stops. For a given truss configuration, the location of each stop along the length of the respective channel is indicated by a computer readout in terms of the equivalent number of revolutions of the corresponding threaded shaft. A meter or counter is provided at the edge end of the shaft so that the operator may rotate the shafts until the counter readings are matched with the respective numbers provided by the computer readout. Such an installation is not only extremely expensive, but is necessarily limited to only a single stop per channel.

U. S. Pat. No. 4,943,038, issued July 24, 1990 in the name of C. W. Harnden and assigned to Alpine Engineered Products, Inc., is directed to apparatus of the foregoing description.

SUMMARY OF THE INVENTION

This invention facilitates and accelerates formation of a jig setup to a remarkable degree in comparison with the prior systems. The invention provides a jig in which a plurality of upwardly open channels traverse the table at its upper surface. The channels are adapted to receive a plurality of stop units for sliding movement relative to the channels, each of the stop units being freely movable to any location along the length of the respective channel. Also included are means for releasably fixing the locations of the received stop units relative to the respective channels. Each channel is provided with a scale, and each stop unit carries index means which may be aligned with the scale to locate the stop unit accurately relative to the channel.

Although most truss configurations require only one or two stop units per channel for accurate assembly, three or more stop units per channel may be employed, to provide, for example, for accurate placement of intermediate truss members.

The jig is particularly useful in conjunction with a computer program which provides a numerical readout for positioning each stop. Thus, not only can each jig setup be achieved and adjusted rapidly, but any truss configuration may be reproduced or duplicated by simply referring to a computer printout or electronic record, which can be retained on file for each truss pattern.

These and other features, objects and advantages of the invention will be apparent from the ensuing description in conjunction with the accompanying drawings and the appended claims.

THE DRAWINGS

FIG. 1 is a top plan view of a truss jig in accordance with the invention, with stops located for defining a complex truss configuration shown assembled;

FIG. 2 is an enlarged perspective view from above and from an end of one of a plurality of identical channels of the table of FIG. 1 and of a stop unit carried thereby, adjacent portions of the table being omitted;

FIG. 3 is a somewhat further enlarged vertical sectional view traversing the channel of FIG. 2 and showing particulars of the stop unit carried thereby and the manner in which the channel is mounted in the table, adjacent portions of which are shown in fragmentary form;

DESCRIPTION OF THE PREFERRED EMBODIMENT

Figure 4:
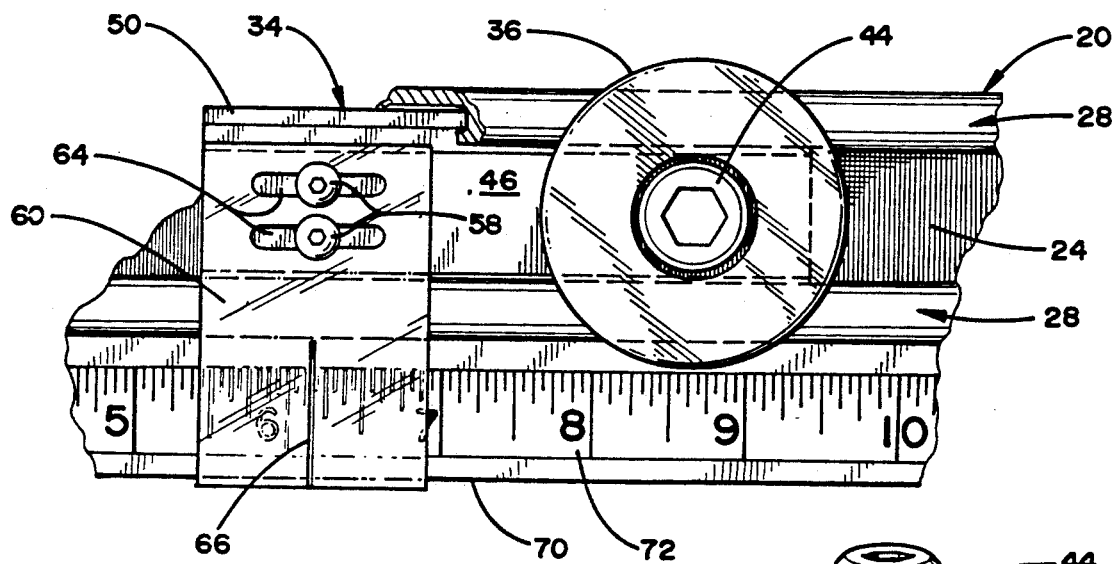
FIG. 4 is a fragmentary top plan view of the channel of FIGS. 2 and 3 and the stop unit carried thereby; an FIG. 5 is an exploded perspective view of the stop unit of FIGS. 2, 3 and 4.

With particular reference to FIG. 1, there is illustrated a jig formed in accordance with this invention and identified generally by the numeral 10. Jig 10 includes a table 12 which may take any one of a variety of constructions, a typical example of one such construction being partially illustrated in FIG. 3. In this construction table 12 includes joists or beams, one of which is shown in fragmentary form at 14 in FIG. 3, the joists supporting the table decking in the form of panels 16 suitably comprising relatively heavy planks or plywood sections. These are secured to the joists or beams 14 by any suitable fastening means (not shown). The decking panels of table 12 may alternatively comprise suitably dimensioned metal plates or sheets. In any case, their upper surfaces lie in a single horizontal plane to form the working surface of table 12.

Table 12 is constructed with longitudinally spaced, transversely extending grooves 18 (FIG. 3), each defined by the adjacent panels 16, in which there are seated stop locating units generally identified by the numeral 20, a typical locating unit being illustrated in FIG. 2. Included in each locating unit 20 is an elongated channel 22 which is preferably formed of heavy metal sheet and includes a base 24, opposed upstanding sides 26 and inwardly turned upper lips 28. Each lip 28 in turn comprises a generally rounded top portion 30 and terminates in a depending flange 32 spaced from the adjacent channel side 26.

Each of channels 22 may be fixed in place by any suitable means, depending upon the particular table construction selected. The channel illustrated in FIG. 3 is fixed by means of a series of lag bolts, for example, one of which is visible in part at 74, which extend through base 24 of the channel into the underlying joist 14.

The particular dimensions of table 12 are not in any way critical to the invention. The long dimension of such tables generally ranges between 40 and 80 feet, and the short dimension between 10 and 14 feet, the latter dimension being limited as a practical matter by the fact that trusses having a height greater than 14 feet cannot presently be transported on most roads and highways. It will be apparent that channels 22 can be provided in virtually any length required by the dimensions of the table, and it has been found adequate to space them on centers of from 32 inches to 72 inches, though a range of 36 inches to 48 inches is preferred. The number of channels 22 required will of course vary with the long dimension of the table and the spacing selected.

Each channel 22 carries one or more stop units generally identified by the numeral 34, each of which includes a stop 36 of rollerlike disk form. Stop 36 is provided with a central vertical bore 38 extending centrally therethrough to receive the shaft of a bolt 42, bore 38 terminating at its upper end in a counterbore 40 of a diameter to receive an enlarged head 44 of bolt 42. Preferably the bolt head 44 is formed with a conventional hexagonal recess, as shown, to receive an Allen wrench, not shown.

Each stop unit 34 also includes an elongated clamp member 46 suitably in the form of a rectangular bar at the upper side of which is formed a pair of elongated grooves 48, open at their opposite ends, which define outer clamping fingers 50 and a central supporting rib 52.

Clamp member 46, adjacent to one of its ends, is provided with a vertically disposed bore 54 internally threaded to mate with the external thread of bolt 42. Stop 36 is assembled with clamp member 46, conveniently before insertion in a respective one of channels 22, by passing the shaft of bolt 42 through bore 38 in stop 36 and then threadedly engaging bolt 42 in bore 54 of clamp member 46 with bolt head 44 seated within counterbore 40 of the stop.

Adjacent to the opposite end of the clamp member 46, the upper surface of rib 52 is interrupted by a pair of identical internally threaded vertical bores 56, smaller in diameter than bore 54. Received in the smaller bores is a pair of machine screws 58 which secure a transparent index plate 60 to the clamp member 46, preferably formed of a clear, hard but tough plastics material.

Figure 5:
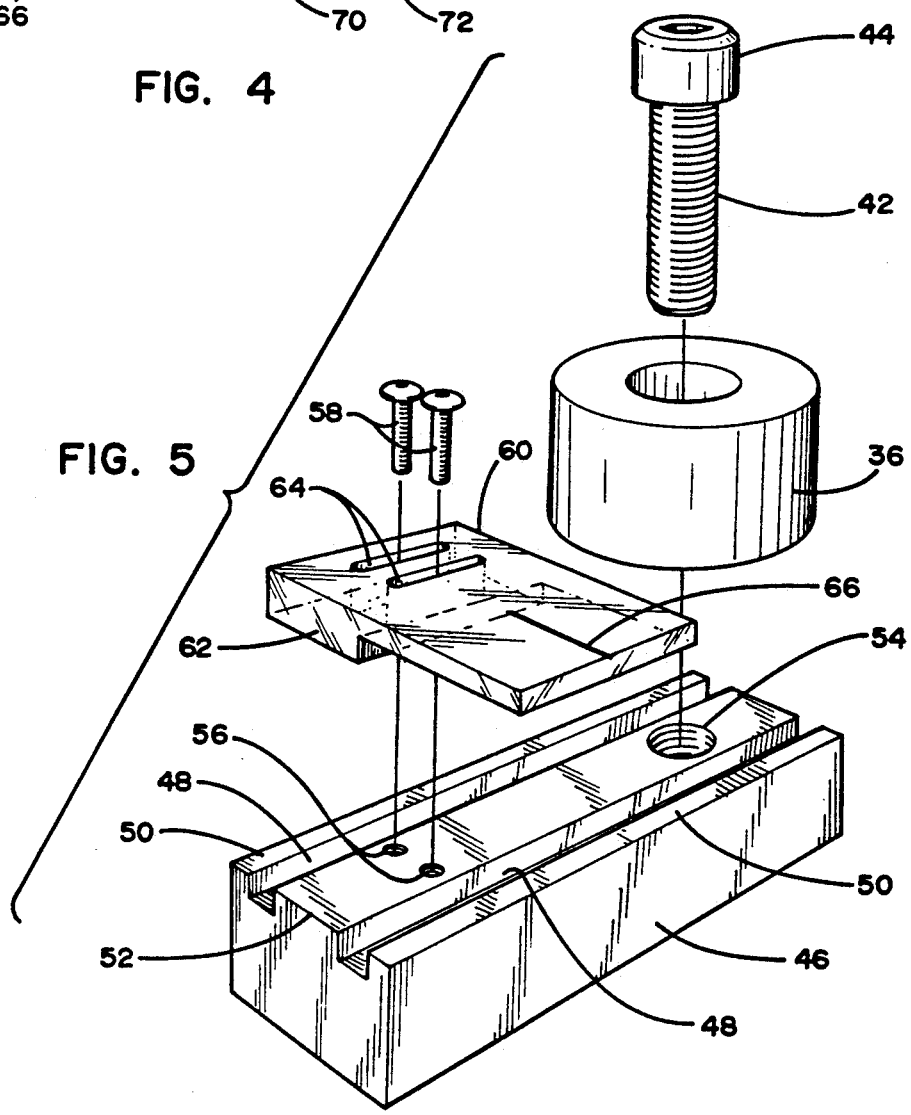

The end of index plate 60 adjacent to clamp member 46 is thickened or stepped as at 62 (FIGS. 2 and 5) to space the underside of the remainder of the index plate above channel 22, as is best seen in FIG. 3. Screws 58 extend through elongated slots 64 in index plate 60 which permit adjustment of the distance of the index plate 60 from stop 36 when the latter is assembled with clamp member 46, though it has been found that such adjustability is not necessary and that the position of index plate 60 on clamping member 46 may be permanently fixed without adversely affecting performance.

Index plate 60 is provided with an index mark or scribe mark 66 extending in directions normal to the longitudinal dimension of clamp member 46. Scribe mark may be imprinted or inscribed on the upper surface of the index plate, as shown, or on its lower surface.

Referring now to FIGS. 2 and 3, one of the opposite sides 26 of channel 22 has secured thereto by any suitable means such as welding (not shown) a support 68 in the form of an angle iron having an upper horizontal flange 70 extending laterally outwardly from the channel along its length. A scale 72 is mounted on the upper surface of the flange 70, which is recessed below the working surface of table 12 provided by the coplanar upper surfaces of panels 16. It will be apparent that the position of index mark 66 on scale 72 may be read to provide a precise indication of the location of the corresponding stop 36 along the length of the respective channel 22.

The opposite ends of each of channels 22 are open and coincide with opposite edges of table 12, as represented in FIGS. 2 and 1, respectively. Thus each of the assembled stop units 34, with bolt 42 only loosely engaged in bore 54, may be inserted in a selected one of channels 22 by way of the open opposite ends thereof. This is correctly done, referring particularly to FIG. 2, by so orienting the assembled stop unit relative to the channel that stop 36 will be supported upon top portions 30 of lips 28 of the channel, that depending flanges 32 of the channel will be received in grooves 48 of clamp member 46, and that index mark 66 will overlie scale 72. It is important to note that two or three or more stop units 34 may be inserted in this manner in a single one of channels 22. Alternatively, any of stop units 34 may be assembled with clamp member 46 already inserted in its respective channel but otherwise in much the same manner.

With bolt 42 still engaged only loosely in bore 54, each of stop units 34 may now be slidingly moved along the length of the respective channel 22 until a predetermined location of the respective stop 36 is reached, as visually indicated by index mark 66 in conjunction with scale 72. Bolt 42 is now rotated to secure it tightly within bore 54 to clamp lips 28 securely between stop 36 and clamping fingers 50 and thereby fix the respective stop at that location.

Though the invention is especially useful in the manufacture of wooden trusses, such as the typical wooden roof truss 76 illustrated in FIG. 1, it will be understood that it is not limited to such use but will find application in the assembly of virtually any structure which is essentially two-dimensional in character and is formed of discrete members which are laid out in a predetermined relationship to one another and interconnected.

In any event, layout of the structure to be assembled may be assisted by a computer to provide a readout for locating the various stops. For example, assuming that stop units 20 from left to right as viewed in FIG. 1 were to be identified respectively by letters A, B, C, etc., typical readouts for locating two of stop units 34 might be "C 03 06 04" and "C 05 11 12", meaning that the respective index marks 66 of two units disposed in the third channel from the left were to be aligned with marks on the scale 72 adjacent to that channel representing 3 feet, 6 and 4/16 inches, and 5 feet, 11 and 12/16 inches, respectively.

Such computer assistance forms no part of the present invention, but suitable computer software is available from numerous sources and formulation of an appropriate program is well within the ordinary skill of the computer-programming art.

The computer readouts for forming a particular structure such as truss 76 may be retained on file, electronically or in the form of a printout, and if the structure is to be duplicated at a later time, it is merely necessary to call the readouts up and lay out and fix stops 36 in the number and at the locations required to reproduce the pattern of the structure.

While the invention has been described in connection with a specific embodiment thereof, it will be understood that this is by way of illustration and not of limitation, and that the scope of the appended claims should be construed as broadly as the prior art will permit.

What is claimed is:

1. A locating unit for a jig, comprising an elongated channel and at least one stop unit including a stop, a clamp member, and locking means, the channel having a pair of opposed parallel sides terminating in a respective pair of opposed upper lips extending inwardly therefrom to define an open top of the channel, the stop being of a disk form adapted to be slidably seated on the lips, the clamp member being slidably receivable in the channel below the stop, the locking means interconnecting the stop and the clamp member and being operable from above the stop to releasably fix the location of the stop unit along the length of the channel.

2. A locating unit according to claim 1, wherein the locking means comprises a bolt threadably received in the clamp member and mounting the stop thereto.

3. A locating unit according to claim 1, wherein the clamp member is elongated and the stop is disposed adjacent to one end of the clamp member, the stop unit including index means carried by the clamp member at a predetermined distance from the stop for locating the stop relative to the channel.

4. A locating unit according to claim 3, including a scale extending outwardly of one of the sides of the channel, the index means extending transversely outwardly of the clamp member in a position to overlie the scale.

5. A locating unit according to claim 3, including means mounting the index means on the clamp member for adjustment of the distance of the index means from the stop.

6. A locating unit according to claim 1 wherein each channel is open at opposite ends thereof for insertion and removal of the clamp member.

* * * * *